United States Patent [19]

Carpenter et al.

[11] Patent Number: 5,463,193
[45] Date of Patent: Oct. 31, 1995

[54] VIBRATION ISOLATION MODULE

[75] Inventors: Allan L. Carpenter, Surrey Downs; Mark W. Adkins, Mylore, both of Australia

[73] Assignee: Australia Sonar Systems Pty Ltd, Technology Park, Australia

[21] Appl. No.: 36,707

[22] Filed: Mar. 25, 1993

[30]     Foreign Application Priority Data

May 8, 1992 [AU] Australia ................... PL2301

[51] Int. Cl.⁶ ...................................... F16F 15/00
[52] U.S. Cl. ........................... 181/207; 367/20; 367/154; 174/101.5
[58] Field of Search ..................... 181/207, 208, 181/209; 367/20, 154; 174/101.5

[56]            References Cited

U.S. PATENT DOCUMENTS 4,090,168  5/1978  Miller et al. ................ 174/101.5 X
5,062,085  10/1991 Andrews, Jr. .................... 367/20

*Primary Examiner*—Khanh Dang
*Attorney, Agent, or Firm*—Oblon, Spivak, McClelland, Maier, & Neustadt

[57]               ABSTRACT

A Vibration Isolation Module (VIM) for a towed acoustic streamer includes cylindrical masses attached at regular spacing to a central core of viscoelastic damping material, which may be extruded over a snubbed elastic strength member. Further snubbed elastic strength members may be attached around the outer diameter of the masses. Viscous "dash-pot" type dampers are installed within the masses. The space between the masses is filled with open cell plastic foam, around which is wrapped a layer of power and data cables. A jacket of damped thermoplastic is extruded over the cable layer and caps containing a fluid filling valve are attached at each end of the module, and the interior void is filled with a low density, high viscosity fluid. The "dash-pot" type dampers can be replaced by a stocking which, under extension, compresses the foam and forces fluid through pores of the foam, thus simulating the viscous damping of the "dash-pot" type dampers.

11 Claims, 2 Drawing Sheets

VIBRATION ISOLATION MODULE

BACKGROUND OF THE INVENTION

1. Field of the Invention

This invention relates to the construction of Vibration Isolation Modules (VIMs) which are typically used on either side of an acoustic aperture of a towed acoustic array to minimize performance degradation due to transmitted mechanical vibrations.

2. Discussion of the Background

Conventional towed arrays have consisted of a towing cable (negatively buoyant to achieve submersion to the required depth), a forward Vibration Isolation Modules (to minimize the transmission of mechanical vibration from the tow cable to the acoustic array), an array of acoustic (and non-acoustic) sensors, and an aft VIM (to minimize transmission of vibration from the "flapping tail" forward to the acoustic array). To perform the required vibration isolation functions, the VIMs, like the suspension of a motor vehicle must not only provide elastic isolation (i.e., the spring function) but must also dissipate the produced vibrational energy (i.e., the damping function).

In the past, VIMs have been constructed that have provided adequate elasticity, albeit for a limited range of tow loads and limited damping. Their effectiveness has been limited, and restricted to a narrow range of operating conditions.

SUMMARY OF THE INVENTION

It is therefore an object of the present invention to provide a Vibration Isolation Module (VIM) which will overcome or at least reduce the limitations of current art.

Accordingly, the invention provides a Vibration Isolation Module for minimizing the transmission of mechanical vibrations in an underwater structure, the Vibration Isolation Module having two opposite ends, and comprising first and second attachment mechanisms located at said two opposite ends, respectively, for attachment to respective parts of the underwater structure, an elastic member connected to the first and second attachment mechanisms for providing vibration isolation between the first and second attachment mechanisms, visco-elastic dampers connecting the first and second attachment means for attenuating the transmission of low frequency vibrations between the first and second attachment means, and viscous damper located between the first and second attachment means for attenuating the transmission of high frequency vibrations between the first and second attachment mechanisms.

The invention achieves the three desirable performance aspects of spring-mass isolation, viscous damping and visco-elastic damping.

Thus, the measures here proposed increase both the elastic isolation and the damping, and significantly extend the operating range of both tow speeds and vibrational frequency over which the VIM will provide effective operation.

BRIEF DESCRIPTION OF THE DRAWINGS

Two embodiments of the invention will now be described, by way of example, with reference to the drawings, in which FIG. 1 schematically illustrates the "classical" implementation of the invention, and shows a longitudinal cross-section through one end of a Vibration Isolation Module.

DESCRIPTION OF THE PREFERRED EMBODIMENTS

Figure 1:
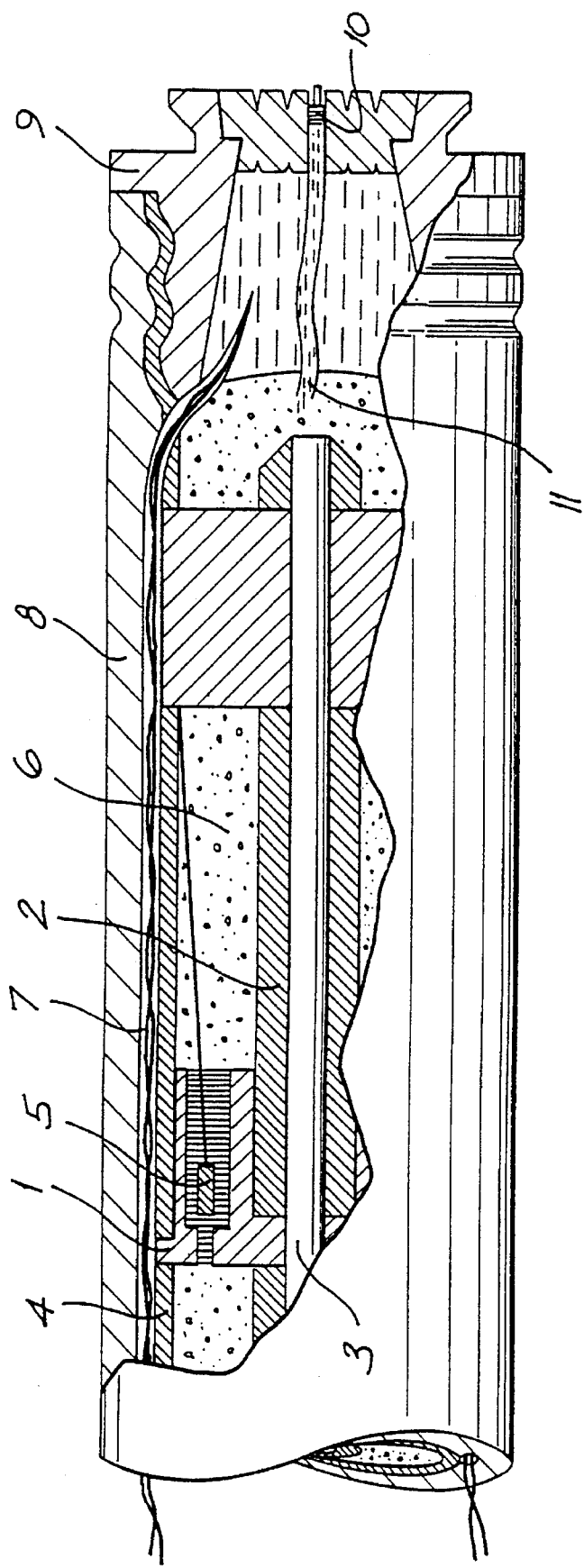

As shown in FIG. 1, one aspect of the preferred embodiment involves the provision of cylindrical masses 1 attached with regular spacing to a central core of a damper of viscoelastic damping material 2, which may be extruded over a snubbed elastic strength member 3. The snubbed elastic strength member is an elastic strength member which is prevented from stretching beyond a certain predetermined length. Normally such "snubbing" is achieved by providing a nonelastic strength member, of slightly greater length than the elastic strength member, alongside the elastic strength member so as to prevent the elastic strength member from extending to a length which exceeds the length of the non-elastic strength member. Further snubbed elastic strength members 4 may be attached around the outer diameter of the masses 1.

Viscous "dash-pot" type dampers 5 are installed within the masses 1. A "dash-pot" is a device used to dampen and control motion, in which an attached piston is loosely fitted to move slowly in a cylinder containing oil. The viscous "dash-pot" type dampers 5 are formed by apertures which pass through at least some of the masses 1. The interior of the Vibration Isolation Module is filled with a high viscosity fluid 11 which, during use of the Vibration Isolation Module, passes through the apertures in order to produce viscous damping. The space between the masses 1 is filled with open cell plastic foam spacers 6, around which is wrapped a layer of power and data cables 7. A jacket of damped thermoplastic 8 is extruded over this cable layer 7 and caps 9 containing a fluid filling valve 10 are attached at each end of the module, for filling the interior of the Vibration Isolation Module with the low density, high viscosity fluid 11.

In the repetitive cyclic extension, the multiple spring mass system as obtained provides vibration isolation, the cyclic distortion of the visco-elastic core provides low frequency damping, and the repetitive transfer of the high density fluid 11 through the apertures in the masses 1 provides the high frequency damping.

Figure 2:
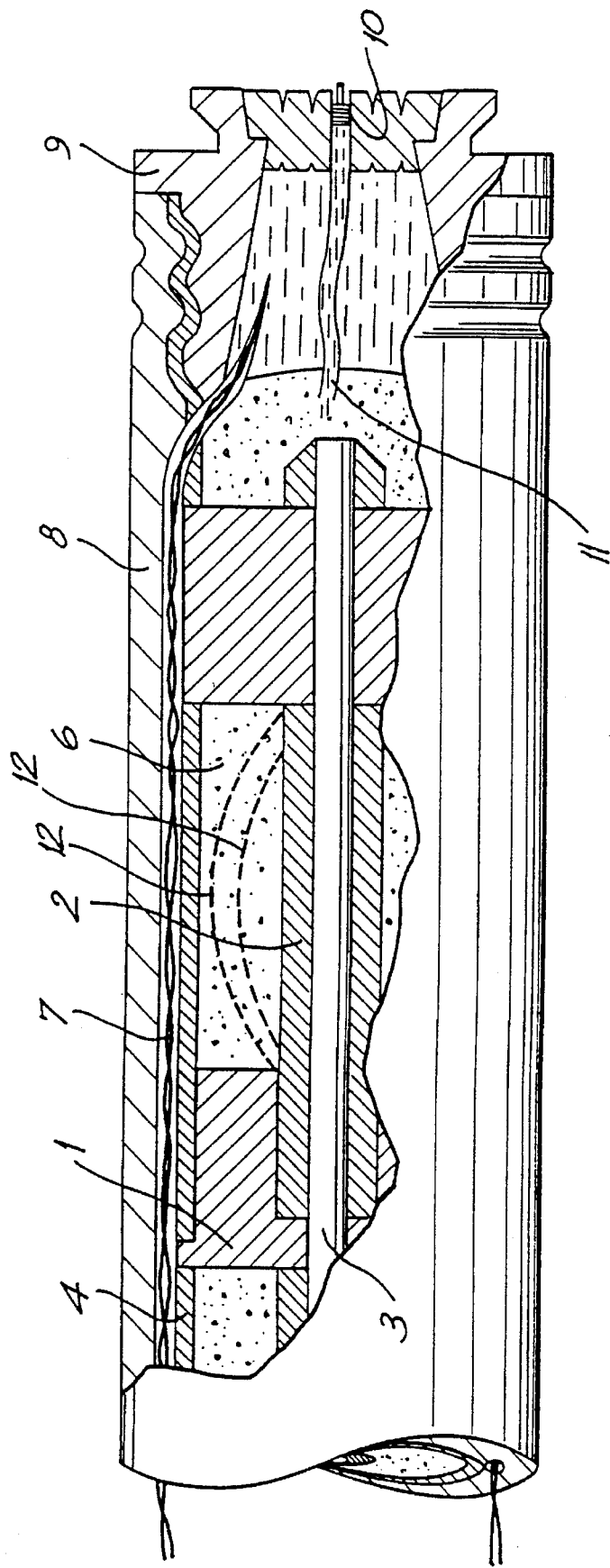
FIG. 2 schematically illustrates an alternative embodiment, in which the "classical" viscous damping measure is replaced by a more cost effective solution.

In an alternative preferred embodiment, as shown in FIG. 2, the general arrangement is as before, except that the "dash-pot" dampers (item 5 of FIG. 1) are removed. In their place is a braided flexible, open-weave stocking 12 which comprises a damper. The stocking 12 surrounds the open cell foam spacers 6, and is attached to the central core 2 by the masses 1 which damp the stocking to the central core. Under repetitive cyclic extension the braided stocking 12 pulls down, compressing the foam spacers and forcing fluid out through the foam pores. This action simulates that of the classic dash-pot damper action of the first embodiment, and hence provides the required viscous damping. It is however, a much more cost-effective implementation. It should be noted that, in FIG. 2, although the foam spacer 6 is shown, for consistency with FIG. 1, in an uncompressed configuration, the stocking 12 is shown in its pulled-down position.

The foregoing describes only some aspects of an embodiment of the present invention, and modifications, obvious to those skilled in the art, can be made thereto without departing from the scope of the present invention.

What we claim is:

1. A vibration isolation module for minimizing the transmission of mechanical vibrations in an underwater structure, the vibration isolation module having two opposite ends, and comprising:

first and second attachment mechanisms located at said two opposite ends, respectively, and attached to respective parts of the underwater structure, an elastic member connecting the first and second attachment mechanism said elastic member providing vibration isolation between the first and second attachment mechanisms, a visco-elastic damper connecting the first and second attachment mechanisms, said visco-elastic damper attenuating the transmission of low frequency vibrations between the first and second attachment mechanisms, a viscous damper located between the first and second attachment mechanism, said viscous damper attenuating the transmission of high frequency vibrations between the first and second attachment mechanisms, a fluid-tight container which defines a fluid-tight enclosure and surrounds said elastic member, said visco-elastic damper and said viscous damper and a plurality of masses spaced apart within said fluid-tight enclosure so as to divide said fluid tight enclosure into a plurality of sub-enclosures.

2. A vibration isolation module according to claim 1, which further comprises a plurality of elongate elastic members, said masses being connected together by said elongate elastic members.

3. A vibration isolation module according to claim 1, wherein said visco-elastic damper comprises a central core of said visco-elastic damping material damper.

4. A vibration isolation module according to claim 1, further comprising:

a plurality of open cell foam spacers filling said sub-enclosures.

5. A vibration isolation module according to claim 1, wherein said fluid-tight container comprises an elongate jacket having two ends which define two openings at opposite ends of the jacket, and two end caps attached to said two ends so as to cover said two openings respectively.

6. A vibration isolation module according to claim 1, wherein said masses are cylindrical in shape.

7. A vibration isolation module according to claim 2, wherein said elongate elastic members comprise snubbed elastic members, and the vibration isolation module comprises a plurality of elongate nonelastic strength members of greater length than said elongate elastic members, said elongate nonelastic strength members being arranged parallel with, and alongside, said elongate elastic members so as to prevent extension of the elongate elastic members to a length which exceeds the length of said elongate nonelastic strength members, thus effectively snubbing extension of the elongate elastic members.

8. A vibration isolation module according to claim 5, which comprises power and data cables, wherein said power and data cables run spirally within said jacket.

9. A vibration isolation module according to claim 2, wherein at least some of said masses have apertures formed therein so as to provide a path between adjacent sub-enclosures for said high viscosity fluid, and wherein, in use, passage of said high viscosity fluid through said apertures produces viscous damping, and said apertures and said high viscosity fluid together comprise said viscous damping mechanism.

10. A vibration isolation module according to claim 4, wherein said visco-elastic damper comprises a central core of visco-elastic damping material, and said viscous damper comprises a braided, open-weave stocking surrounding said open cell foam spacers, and wherein said stocking is attached to said central core of visco-elastic damping material at the locations of said masses.

11. A vibration isolation module according to claim 1, which comprises a low density, high viscosity fluid which fills said fluid-type enclosure.

* * * * *